(12) United States Patent
Brown et al.

(10) Patent No.: US 11,778,111 B1
(45) Date of Patent: Oct. 3, 2023

(54) MOBILE DEVICE WITH SLIDE-OUT OFFICE EQUIPMENT

(71) Applicant: Xerox Corporation, Norwalk, CT (US)

(72) Inventors: Donald A. Brown, Honeoye Falls, NY (US); Howard S. Ryan, Skaneateles, NY (US); Paul E. Carlson, Skaneateles, NY (US); Deborah A. Laun, Syracuse, NY (US); Michael W. Konieczny, Skaneateles, NY (US); David T. Middleton, Jr., Skaneateles, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/700,625

(22) Filed: Mar. 22, 2022

(51) Int. Cl.
 *H04N 1/00* (2006.01)
 *B41J 3/36* (2006.01)

(52) U.S. Cl.
 CPC ............ *H04N 1/00533* (2013.01); *B41J 3/36* (2013.01); *H04N 1/00551* (2013.01); *H04N 1/00562* (2013.01); *H04N 1/00885* (2013.01)

(58) Field of Classification Search
 None
 See application file for complete search history.

(56) References Cited

U.S. PATENT DOCUMENTS

| | | | | |
|---|---|---|---|---|
| 4,645,275 A | * | 2/1987 | Pucci | B41J 29/08 312/277 |
| 4,837,590 A | * | 6/1989 | Sprague | B41J 3/36 D14/335 |
| 5,212,628 A | | 5/1993 | Bradbury | |
| 5,437,367 A | * | 8/1995 | Martin | G06F 1/1628 206/320 |
| 5,764,475 A | * | 6/1998 | LeVander | G06F 1/1628 361/679.55 |
| 6,286,440 B1 | | 9/2001 | Jyringi | |
| 6,578,708 B2 | | 6/2003 | Barnett | |
| 7,278,644 B2 | | 10/2007 | Villarreal | |
| 8,162,330 B2 | | 4/2012 | Melkumyan et al. | |
| 8,659,650 B2 | | 2/2014 | Mugica et al. | |
| 9,380,847 B1 | | 7/2016 | Killebrew | |
| 9,414,660 B1 | | 8/2016 | Al-Hasan | |
| 9,775,430 B2 | | 10/2017 | Abu-Akel et al. | |
| 10,713,347 B2 | | 7/2020 | Talwerdi et al. | |
| 2002/0063072 A1 | * | 5/2002 | Pham | A45C 9/00 206/320 |
| 2005/0099102 A1 | * | 5/2005 | Villarreal | A47B 21/00 312/237 |
| 2005/0279869 A1 | * | 12/2005 | Barklage | B60N 3/00 241/236 |
| 2007/0007094 A1 | * | 1/2007 | Smith | A47B 85/06 190/11 |
| 2007/0070590 A1 | * | 3/2007 | Littlepage | G06F 1/1628 361/679.02 |

(Continued)

*Primary Examiner* — Dung D Tran
(74) *Attorney, Agent, or Firm* — Gibb IP Law Firm, LLC (57) ABSTRACT

An apparatus includes a portable case, and a slide-out printer is connected to the portable case. The slide-out printer is connected so as to slide in and out of the portable case. The slide-out printer includes a scanner, and the scanner includes a platen. The apparatus also includes a slide-out shredder connected to the portable case. The slide-out shredder is similarly connected to slide in and out of the portable case.

17 Claims, 7 Drawing Sheets

(56) References Cited

U.S. PATENT DOCUMENTS

| | | | | |
|---|---|---|---|---|
| 2007/0273935 A1* | 11/2007 | Ide | ..................... | H04N 1/00718 |
| | | | | 358/474 |
| 2008/0023283 A1 | 1/2008 | Sutker et al. | | |
| 2018/0297038 A1* | 10/2018 | Costello | .................. | B02C 25/00 |
| 2019/0366351 A1* | 12/2019 | Calloway | ............ | B02C 18/2216 |

* cited by examiner

MOBILE DEVICE WITH SLIDE-OUT OFFICE EQUIPMENT

BACKGROUND

Systems and methods herein generally relate to portable devices and more particularly to mobile office equipment devices.

Modern printing devices developed in the second half of the twentieth century were heavy large devices that were not very portable, but such devices sometimes could be rolled between office spaces (if they included wheels). Subsequent technological advancements have reduced the size and weight of printing devices, eventually allowing small printers to be easily carried by a single person.

Additionally, special purpose carrying bags/cases have been developed for modern electronic devices. Such bags have shapes that match the size of a given device and these carrying bags have straps and cushioning designed to hold correspondingly sized, devices such as printers and laptop computers, securely and safely.

SUMMARY

An exemplary apparatus herein includes (among other components) a portable case having a slide-out handle and wheels. The slide-out handle and the wheels are connected to opposing ends of the portable case. Additionally, fold-out legs are connected to the bottom surface of the portable case.

Also, a lid is connected to the portable case. The lid is rotatably connected to the portable case along at least one hinge so as to be rotatably openable. There is a worksurface along the exterior of the portable case. The worksurface faces an approximately opposite direction to the bottom surface of the portable case. The lid is sized and positioned to enclose the worksurface when in a closed orientation and to reveal the worksurface when in an open orientation.

A slide-out printer is connected to the portable case. The slide-out printer is connected to slide in and out of the portable case, while always remaining connected to the portable case. The slide-out printer includes an output slot adapted to output printed sheets. The portable case includes a corresponding case opening. The case opening is positioned adjacent the output slot when the slide-out printer is in a fully inserted position (slid fully into the portable case). The case opening is sized and positioned to allow the printed sheets being output from the output slot when the slide-out printer is in the fully inserted position to pass through the case opening and exit the portable case.

The slide-out printer includes a scanner. The scanner includes a platen, and the top surface of the platen is approximately parallel to the worksurface. Also, a platen cover is rotatably connected to the scanner by way of at least one hinge, etc. The platen cover is connected and positioned to cover the platen when rotated to a closed position and to reveal the platen when rotated to an open position. The scanner and platen cover are sized and positioned to fit within the portable case and allow the slide-out printer to be slid into the portable case when the platen cover is in the closed position.

The slide-out printer includes a slide-out output tray that is connected to the slide-out printer at a position adjacent the slide-out printer's output slot. The slide-out output tray is connected to slide in and out of the slide-out printer, while always remaining connected to the slide-out printer. The slide-out output tray has a top surface positioned to receive printed sheets from the output slot of the slide-out printer. The bottom surface of the portable case and the top surface of the slide-out output tray face approximately opposite directions.

A slide-out shredder is also connected to the portable case. The slide-out shredder is similarly connected to slide in and out of the portable case, while always remaining connected to the portable case. Further, the slide-out shredder has a sheet input into which sheets are fed for shredding and the sheet input faces an approximately opposite direction to the bottom surface of the portable case. The slide-out printer and the slide-out shredder are positioned to extend from opposing sides of the portable case in opposite directions to one another.

Further, a battery is connected to an external surface of the portable case. The battery powers the slide-out printer and the slide-out shredder. Additionally, electrical and communication connection terminals are connected to the portable case and positioned on an external surface of the portable case. The electrical and communication connection terminals are connected internally within the portable case to the scanner and to the printer.

These and other features are described in, or are apparent from, the following detailed description.

BRIEF DESCRIPTION OF THE DRAWINGS

Various exemplary systems and methods are described in detail below, with reference to the attached drawings, in which.

DETAILED DESCRIPTION

As mentioned above, special purpose carrying bags/cases have been developed to hold various devices such as printers and laptop computers securely and safely. These carrying cases allow users to disconnect devices such as printers from their original work surface locations and securely and safely transport such devices to a new location, where the electronic devices are removed from the carrying case, placed on a different work surface, and reconnected to power and other devices in order to be useful.

However, some work environments (such as construction sites or other outdoor sites) are not ideal worksites for expensive and sometimes delicate equipment such as printers and scanners. Often, workers in such environment use workbenches, ladders, or automotive armrests, seats, and tailgates as the work surface; and this can result in high damage and/or failure rates of equipment, especially for items such as printers, scanners, and shredders. Because of this, very little printing is done outside of traditional indoor work areas, even though there is a large need for on-site printing in outdoor environments.

In view of such issues, this disclosure presents a roller-bag style mobile office apparatus that has integrated (non-detachable) slide-out office equipment devices such as a printer, scanner, and shredder. The apparatus includes an impact resistant, shock absorbing case that has a retractable handle and rollerblade style wheels, making the apparatus easily pulled over uneven ground.

Additionally, rather than simply providing dedicated storage locations, padding, and hold-down straps for office equipment (as conventional carry cases do) instead the disclosed apparatus includes permanent, integral, office equipment devices (printer, scanner, shredder, etc.) that can be slid in and out of the case for use when needed. Such devices are powered by a rechargeable battery (that can be removable from the apparatus for quick and easy replacement) and electronic and communication terminals that are positioned on the exterior of the apparatus to allow users to connect items such as laptop computers to the office equipment.

Figure 1:
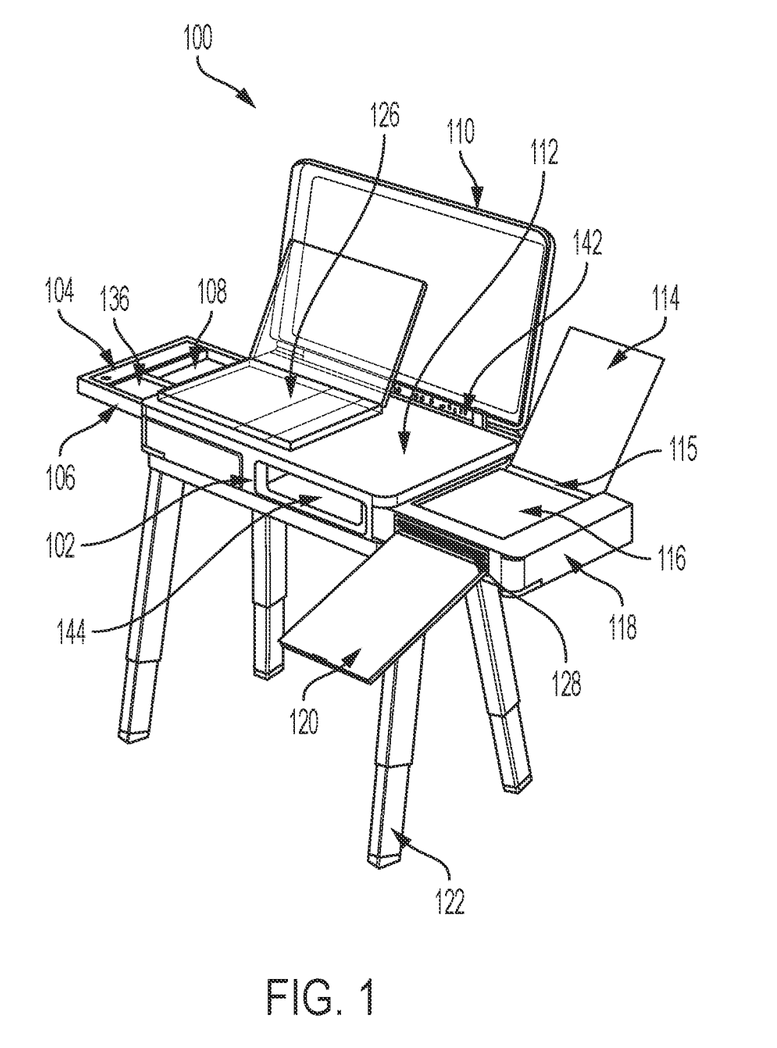
FIGS. 1-2 are schematic diagrams illustrates a front/top perspective view of embodiments herein.
Figure 5:
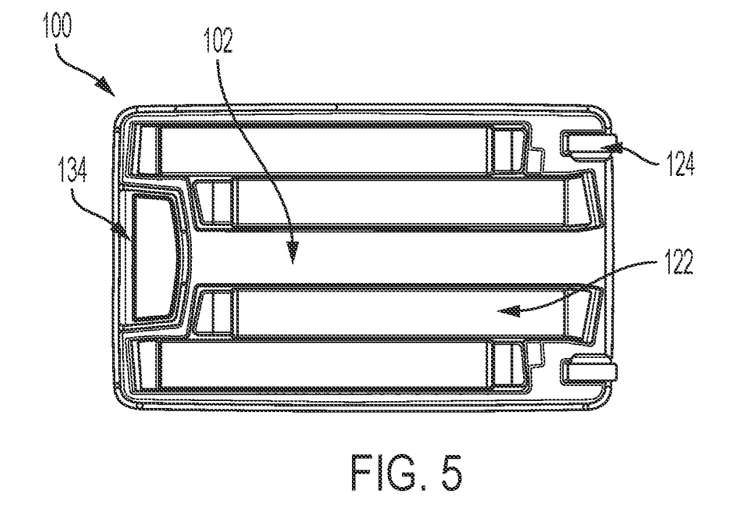
FIG. 5 is a schematic diagram illustrating a bottom view of the same embodiment shown in FIGS. 1-2.
Figure 6:
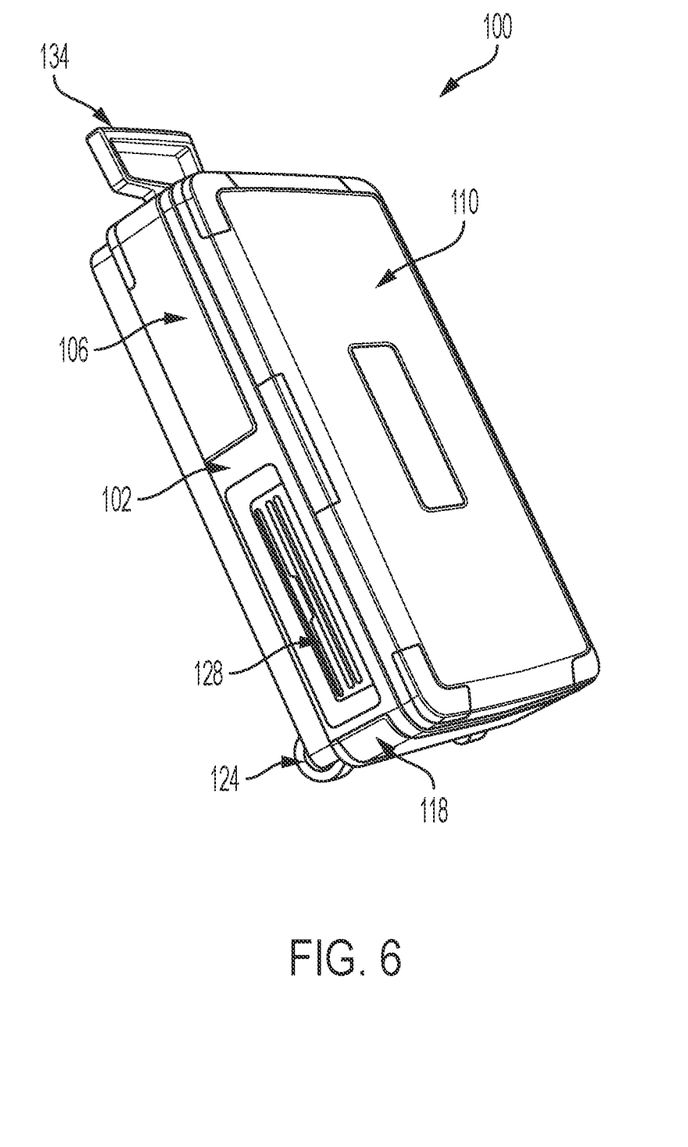
FIG. 6 is a schematic diagram illustrating a side perspective view of the same embodiment shown in FIGS. 1-2.

As shown in FIG. 1 (which is discussed in detail below), when retractable legs 122 of the apparatus are extended and the office devices are extended from the interior of the apparatus, a fully-functional mobile office equipment (MOE) field unit 100 is provided. In such a mobile office equipment apparatus 100, FIG. 1 shows that the user is provided a worksurface 112 on which they can place their laptop computer 126, a sheet input 104 for shredding papers, a platen 116 (and platen cover 114) for easy scanning/copying, and a slide-out printer 118 with output slot 128 and output tray 120 for providing copies and other printed items. FIGS. 5 and 6 show that the legs 122 and such integrated office equipment devices are easily slid/folded into the portable case 102 for easy and quick transport.

Thus, rather than just providing a carrying case for office equipment, instead the devices herein allow a self-powered, fully-functional mobile office equipment field unit capable of being rolled up to any non-traditional work environment to instantly provide a mobile office/desk where copying, printing, scanning, and shredding of office documents can be easily and quickly performed. Just as easily and quickly, the entire mobile office is transformed into a roller-style case by simply sliding the slide-outs in and folding the legs up.

Figure 2:
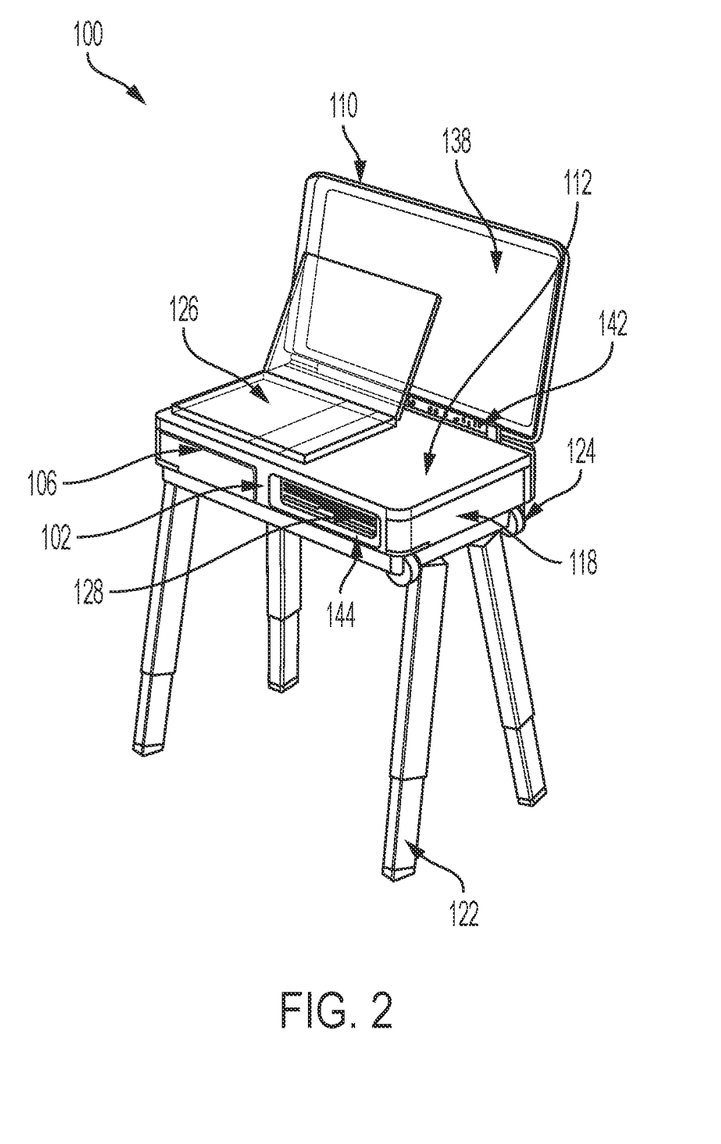
Figure 3:
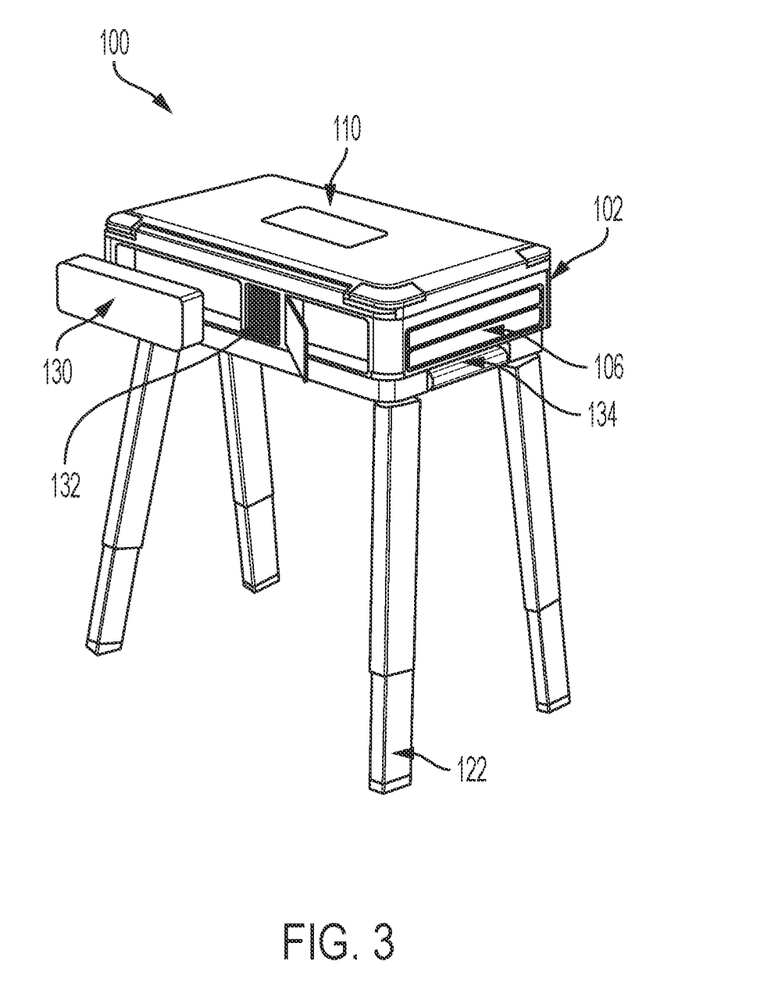
FIG. 3 is a schematic diagram illustrating a back/top perspective view of the same embodiment shown in FIGS. 1-2.
Figure 4:
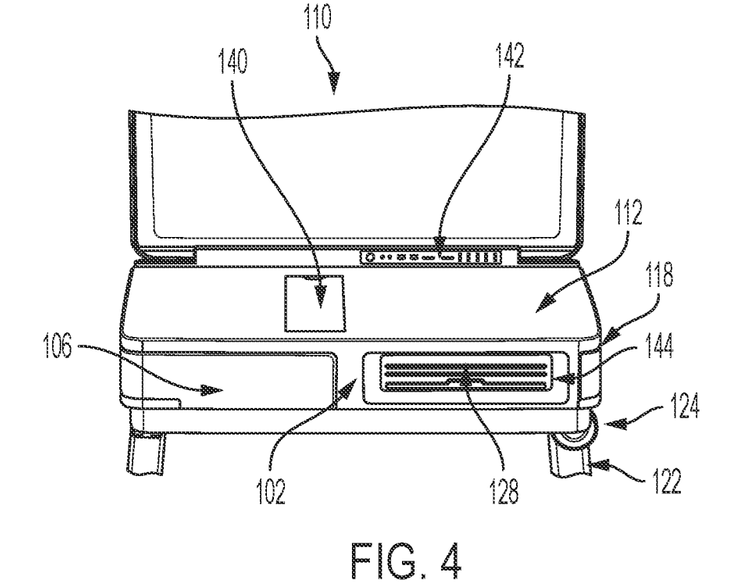
FIG. 4 is a schematic diagram illustrating a front view of a portion of the same embodiment shown in FIGS. 1-2.

In greater detail, FIGS. 1-6 illustrate such an exemplary apparatus 100 herein. Specifically, FIGS. 1-2 illustrate a front/top perspective view of one embodiment herein, FIG. 3 illustrates a back/top perspective view of the same embodiment, FIG. 4 illustrates a portion of a front view of the same embodiment, FIG. 5 illustrates a bottom view of the same embodiment, and FIG. 6 illustrates a perspective side view of the same embodiment herein.

Note that the terms back, front, top, bottom, etc., are only used for shorthand and to indicate relative positions, and such terms are used in an arbitrary orientation terminology. The structures herein do not have a required orientation and the terms top, bottom, side, etc., are used for convenience of discussion, have no absolute orientation meaning, and are only used to represent relative positions of different components. The top is opposite the bottom and the four sides each oppose another one of the sides.

As shown in FIGS. 1-6, such an apparatus 100 that includes (among other components) a portable case 102 having a slide-out handle 134 and wheels 124 (e.g., see FIG. 6). The slide-out handle 134 and the wheels 124 are connected to opposing ends of the portable case 102. Additionally, fold-out legs 122 are connected to the bottom surface of the portable case 102 (e.g., see FIG. 5).

Further, as shown in FIG. 1 for example, a lid 110 is connected to the portable case 102. The lid 110 is rotatably connected to the portable case 102 along at least one hinge so as to be rotatably openable. There is a worksurface 112 along the top exterior of the portable case 102 (e.g., a flat, durable surface upon which items can be placed). The worksurface 112 faces an approximately opposite direction (e.g., top) to the bottom surface of the portable case 102 shown in FIG. 5. The lid 110 is sized and positioned to enclose the worksurface 112 when in a closed orientation (as shown in FIGS. 3 and 6) and to reveal the worksurface 112 when in an open orientation (as shown in FIGS. 1-2). In other options, the lid 110 and worksurface 112 can include integrated lighting and/or solar panels to recharge the on-board batteries.

FIG. 1 illustrates a slide-out printer 118 that is connected to the portable case 102. The slide-out printer 118 is connected to (adapted to) slide in and out of the portable case 102, while always remaining connected to the portable case 102, making the slide-out printer 118 non-detachable from the apparatus 100. The slide-out printer 118 includes an output slot 128 adapted to output printed sheets.

The portable case 102 includes a corresponding case opening 144. The case opening 144 is positioned adjacent the output slot 128 when the slide-out printer 118 is in a fully inserted position (slid fully into the portable case 102) as shown, for example, in FIG. 4. The case opening 144 is sized and positioned to allow the printed sheets being output from the output slot 128 to pass through the case opening 144 and exit the portable case 102 even when the slide-out printer 118 is in the fully inserted position. Further, the printer 118 optionally includes a multi-sheet input slot 115.

The slide-out printer 118 includes a scanner. The scanner includes a platen 116, and the top surface of the platen 116 is approximately parallel to the worksurface 112. Also, a platen cover 114 is rotatably connected to the scanner by way of at least one hinge, etc. The platen cover 114 is connected and positioned to cover the platen 116 when rotated to a closed position and to reveal the platen 116 when rotated to an open position. The scanner and platen cover 114 are sized and positioned to fit within the portable case 102 and allow the slide-out printer 118 to be slid into the portable case 102 when the platen cover 114 is in the closed position. Additionally, the platen cover 114 can serve as the input tray for the original documents fed to the multi-sheet input slot 115.

The slide-out printer 118 includes a slide-out output tray 120 that is connected to the slide-out printer 118 at a position adjacent the slide-out printer's 118 output slot 128 (see FIG. 1). The slide-out output tray 120 is connected to (adapted to) slide in and out of the slide-out printer 118 when the slide-out printer is in the extended (open) position, while always remaining connected to the slide-out printer 118. The slide-out output tray 120 has a top surface positioned to receive printed sheets from the output slot 128 of the slide-out printer 118 and the top surface has a retractable paper stop to keep sheets from sliding off. The bottom surface of the portable case 102 and the top surface of the slide-out output tray 120 face approximately opposite directions. The slide-out nature of the printer 118 fosters easy replacement of consumables (e.g., toner, paper, etc.).

A slide-out shredder 106 is also connected to the portable case 102 (see FIG. 1). The slide-out shredder 106 is similarly connected to (adapted to) slide in and out of the portable case 102, while always remaining connected to the portable case 102, making the slide-out shredder 106 non-detachable from the apparatus 100. Further, the slide-out shredder 106 has a sheet input 104 into which sheets are fed for shredding and the sheet input 104 faces an approximately opposite direction to the bottom surface of the portable case 102. The slide-out shredder 106 can further include a user interface 136 (e.g., touchscreen, etc.) and a storage bin/tray 108. In an alternative shown in FIG. 2, the user interface 138 can be positioned on the lid 110. As shown in FIG. 1, the slide-out printer 118 and the slide-out shredder 106 are positioned to extend from opposing sides of the portable case 102 in opposite directions to one another.

Further, a battery 130 is connected to an external surface of the portable case 102. The battery 130 powers the slide-out printer 118 and the slide-out shredder 106. Additionally, as shown in FIG. 4, electrical and communication connection terminals 142 (e.g., USB connectors, display screen connectors, power connectors, network connectors, portable media exchange connectors, device charging (mobile phone) connectors, etc.) are connected to the portable case 102 and positioned on the external surface of the portable case 102. The electrical and communication connection terminals 142 are connected internally within the portable case 102 to the scanner and to the printer 118. Additionally, the communication connection terminals 142 can include wireless connections (e.g., Wi-Fi, satellite, Bluetooth, etc.) allowing documents to be easily sent and printed from other mobile devices.

Therefore, FIG. 1 shows a front perspective view of the apparatus 100 with the slide-out shredder 106 and slide-out printer 118 extended and the lid 110 open. FIG. 1 illustrates that various work items, such as a laptop computer 126, can be placed on the worksurface 112. In some examples these items (e.g., laptop computer 126) can be connected to the electrical and communication connection terminals 142 using wiring and adapters, etc.

FIG. 2 shows the apparatus 100 from the same perspective as shown in FIG. 1 and with the lid 110 open; however, in FIG. 2, the slide-out shredder 106 and slide-out printer 118 are inserted into the portable case 102. This does not allow the slide-out shredder 106 to be utilized; however, the slide-out printer 118 can still output printed sheets from the output slot 128 through the case opening 144, allowing the slide-out printer 118 to print (but not scan) when inserted into the portable case 102.

FIG. 3 shows a back perspective view of the apparatus 100 with the lid 110 closed and the slide-out shredder 106 and slide-out printer 118 are inserted into the portable case 102. The back perspective view shown in FIG. 3 illustrates the battery 130 and additional electrical and communication connection terminals 132 that are protected by a cover. Note that the slide-out handle 134 and end of the slide-out shredder 106 are illustrated in the perspective shown in FIG. 3.

FIG. 4 is a close-up partial front view that illustrates the positions of the output slot 128 of the slide-out printer 118 as seen through the case opening 144. FIG. 4 also illustrates the location of the electrical and communication connection terminals 142 and shows an optional covered cord storage recess 140. Removing the cover reveals a space within the portable case 102 which is the cord storage recess 140.

FIG. 5 is a bottom view that shows two fixed-orientation wheels 124 and four legs 122 that fold outward at angles non-perpendicular to the bottom of the portable case 102 by way of angled hinges. FIG. 5 also shows again that the slide-out handle 134 and the wheels 124 are connected to opposing ends of the portable case 102.

FIG. 6 shows the apparatus 100 from a front perspective view where the wheels 124 are oriented downward and the slide-out handle 134 is extended and oriented upward. Further, in FIG. 6, the legs 122 are folded in, the lid 110 closed, and the slide-out shredder 106 and slide-out printer 118 are inserted into the portable case 102. Thus, FIG. 6 shows the apparatus 100 is a travel configuration demonstrating that the apparatus could be pulled in a similar manner as roller-bag luggage is pulled, making the apparatus 100 highly mobile.

Figure 7:
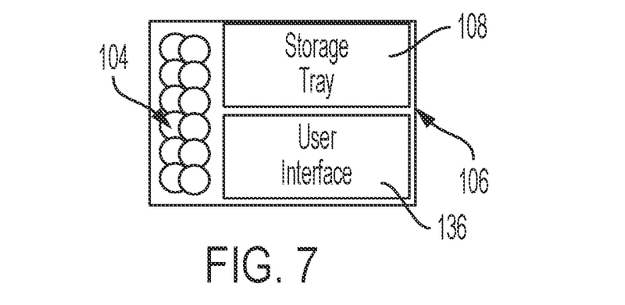
FIG. 7 is a schematic diagram illustrating one example of a slide-out shredder herein.

FIG. 7 illustrates a top-view of one implementation of the slide-out shredder 106 that includes the sheet input 104, which includes opposing rotating cutting wheels or similar shredding devices. Additionally, depending upon space constraints, the slide-out shredder 106 can include the storage tray 108 (which can store paper, act as a receptacle for the shredded sheets, etc.) and the user interface 136. The user interface 136 can be any user input/output device such as a keyboard, keypad, touchscreen, etc., and the user interface 136 can be connected to the slide-out printer, the scanner, any processors, the electrical and communication connection terminals 142, etc.

Note all items identified as being "slide-out" herein can be connected using any common drawer hardware or similar connection structures. Such slide-out items can be fully manual or powered (e.g., using electrical motors and geared tracks). Further, such features can be spring loaded or otherwise motion assisted. Additionally, all such items are optionally lockable using physical or electronic locks.

Figure 8:
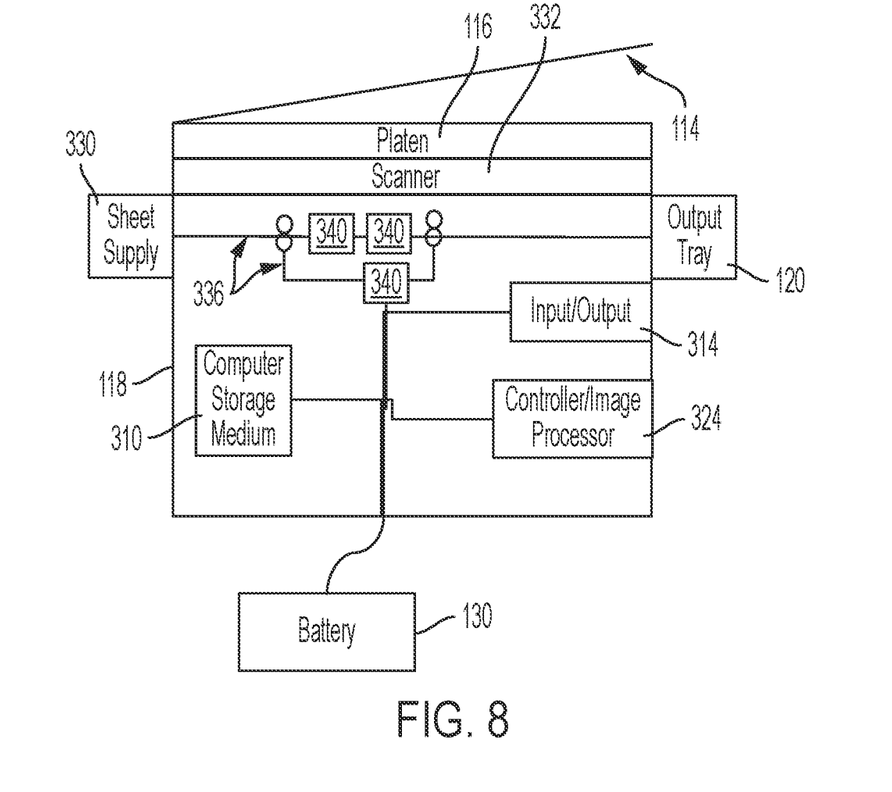
FIG. 8 is a schematic diagram illustrating printing devices herein.

FIG. 8 conceptually illustrates some components of the slide-out printer 118, which can be used with systems and methods herein and can comprise, for example, a printer, copier, multi-function machine, multi-function device (MFD), etc. The slide-out printer 118 includes a controller/tangible processor 324 and a communications port (input/output) 314 operatively connected to the tangible processor 324, the electrical and communication connection terminals 142, the user interface 136, etc.

The input/output device 314 is used for communications to and from the slide-out printer 118 and comprises a wired device or wireless device (of any form, whether currently known or developed in the future). The tangible processor 324 controls the various actions of the slide-out printer 118. A non-transitory, tangible, computer storage medium device 310 (which can be optical, magnetic, capacitor based, etc., and is different from a transitory signal) is readable by the tangible processor 324 and stores instructions that the tangible processor 324 executes to allow the slide-out printer 118 to perform its various functions, such as those described herein. Thus, as shown in FIG. 8, a body housing 118 has one or more functional components that operate on power supplied by the battery 130.

The slide-out printer 118 also includes at least one marking device (printing engine(s)) 340, a media path 336 positioned to supply continuous media or sheets of media from a sheet supply 330 to the marking device(s) 340, etc. Also, the slide-out printer 118 can include at least one accessory functional component such as a scanner 332 (that includes the platen 116 and cover 114) that also operates on the power supplied from the battery 130.

Figure 9:
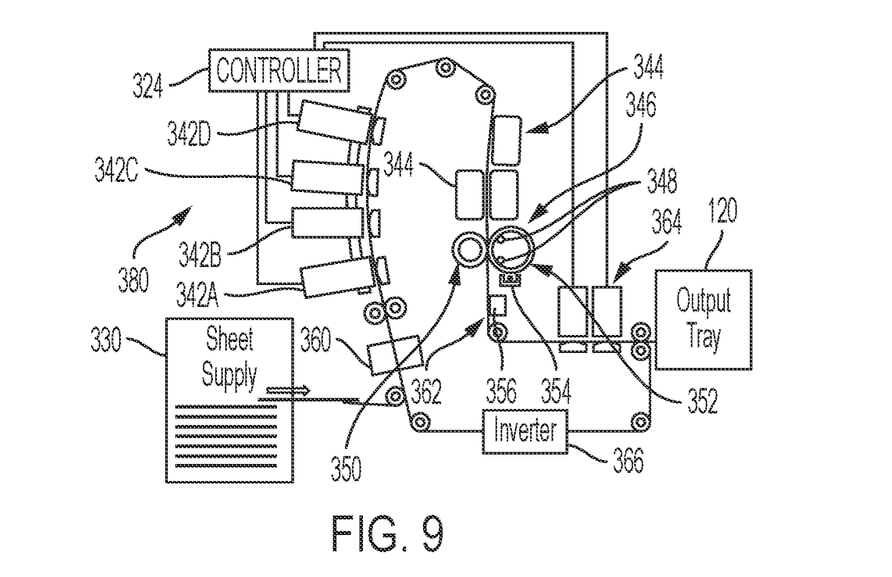
FIG. 9 is a schematic diagram illustrating printing devices herein.
Figure 10:
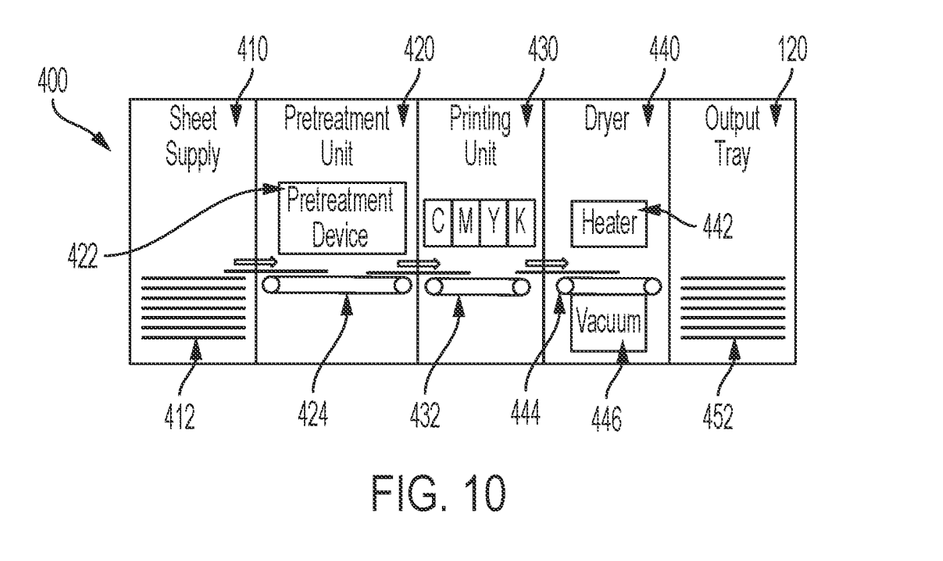
FIG. 10 is a schematic diagram illustrating printing devices herein.

The one or more printing engines 340 are intended to illustrate any marking device that applies a marking material (toner, inks, etc.) to continuous media or sheets of media, whether currently known or developed in the future and can include, for example, devices that use an ink jet imaging system, as shown in FIG. 9, or a high-speed aqueous imaging system, as shown in FIG. 10.

More specifically, FIG. 9 conceptually illustrates one example of the above-mentioned printing engine(s) 380 that is an ink jet imaging system. In this example, the imaging apparatus 380 is in the form of an ink jet printer that employs one or more ink jet printheads, each with an associated solid ink supply (342A-342D). The exemplary direct-to-sheet phase-change ink jet imaging system 380 includes a media supply and handling system 330 configured to supply media (e.g., paper, plastic, or other printable material), a media conditioner 360, printed sheet conditioner 344, coating station 364, etc.

The media is propelled by a sheet transport 362 that can include a variety of motors rotating one or more rollers. For duplex operations, an inverter 366 may be used to flip the sheet over to present a second side of the media to the printheads 342A-342D.

The media conditioner 360 includes, for example, a pre-heater. The pre-heater brings the media to an initial predetermined temperature that is selected for desired image characteristics corresponding to the type of media being printed as well as the type, colors, and number of inks being used. The pre-heater may use contact, radiant, conductive, or convective heat to bring the media to a target preheat temperature.

The media is transported through a printing station that includes a series of color printheads 342A-342D, each color unit effectively extending across the width of the media and being able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). A controller 324 generates timing signals for actuating the ink jet ejectors in the printheads 342A-342D in synchronization with the passage of the media to enable the four colors to be ejected with a reliable degree of accuracy for registration of the differently colored patterns to form four primary-color images on the media. The ink jet ejectors are actuated by the firing signals to correspond to image data processed by the controller 324 that may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction, such as for spot-color applications and the like.

Each of color printheads 342A-342D may include at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads and is configured to reposition the print bar by sliding the print bar along the cross-process axis of the media web. In alternative embodiments, an actuator system may be used that does not physically move the printheads, but redirects the image data to different ejectors in each head to change head position.

The printer may use liquid ink or "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. As used herein, liquid ink refers to melted solid ink, heated gel ink, or other known forms of ink, such as aqueous inks, ink emulsions, ink suspensions, ink solutions, or the like.

Associated with each color unit is a backing member, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature.

Following the printing zone along the media path are one or more "mid-heaters" 344. A mid-heater 344 may use contact, radiant, conductive, and/or convective heat to control a temperature of the media and particularly to bring the media to a temperature suitable for desired properties when passing through the spreader 346. A fixing assembly in the form of the "spreader" 346 is configured to apply heat and/or pressure to the media to fix the images to the media. The function of the spreader 346 is to take what are essentially droplets, strings of droplets, or lines of ink on the sheet and smear them out by pressure and, in some systems, heat, so that spaces between adjacent drops are filled and image solids become uniform. The spreader 346 may include rollers, such as image-side roller 352 and pressure roller 350, to apply heat and pressure to the media, either of which can include heating elements, such as heating elements 348, to bring the media to a predetermined temperature. The spreader 346 may also include a cleaning/oiling station 354 associated with image-side roller 352. The station 354 cleans and/or applies a layer of some release agent or other material to the roller surface. A coating station 364 applies a clear ink to the printed media to modify the gloss and/or to help protect the printed media from smearing or other environmental degradation following removal from the printer.

Operation and control of the various subsystems, components and functions of the imaging system are performed with the aid of the controller 324. The controller 324 may be implemented with general or specialized programmable processors that execute programmed instructions. The controller 324 may be operatively coupled to the print bar and printhead actuators of color printheads 342A-342D in order to adjust the position of the print bars and printheads along the cross-process axis of the media web. In particular, the controller may be operable to shift one or more, or all, of the color units laterally or transverse to the process direction.

The imaging system may also include an optical imaging system 356 that is configured in a manner similar to that for creating the image to be transferred to the web. The optical imaging system is configured to detect, for example, the presence, intensity, and/or location of ink drops jetted onto the receiving member by the ink jets of the printhead assembly. The imaging system may incorporate a variety of light sources capable of illuminating the printed web sufficient to detect printing errors that may be attributable to a faulty or defective ink jet or printhead. The imaging system 356 further includes an array of light detectors or optical sensors that sense the image reflected from the printed web prior to discharge. The controller 324 analyzes the information from the imaging system 356 to determine, among other things, whether a failure or an ink jet or printhead has occurred. The location of the defective printing element is identified and made available to the maintenance technician during a diagnosis procedure. The controller 324 may also use the data obtained from the imaging system 356 to adjust the registration of the color units such as by moving a color unit or one or more printheads. This image data may also be used for color control.

FIG. 10 conceptually illustrates an inkjet or aqueous ink printer system 400 that is one of the printers 118, discussed above. Specifically, FIG. 10 illustrates a high-speed ink jet or aqueous ink image producing machine or printer 400. The printer 400 includes a media supply 410, a pretreatment unit 420, a printing unit 430, a dryer 440, etc. The media supply 410 stores a plurality of media sheets 412 for printing by the printer 400.

The pretreatment unit 420 includes at least one pretreatment device 422 and transport belt 424. The pretreatment unit 420 receives the media sheets from the media supply 410 and transports the media sheets in a process direction (block arrows in FIG. 10) through the pretreatment unit 420. The pretreatment device 422 conditions the media sheets and prepares the media sheets for printing in the printing unit 430. The pretreatment unit 420 may include, for example, a coating device that applies a coating to the media sheets, a drying device that dries the media sheets, and/or a heating device that heats the media sheets to a predetermined temperature. In some embodiments, the printer 400 does not include a pretreatment unit 420 and media sheets are fed directly from the media supply 410 to the printing unit 430. In other embodiments, the printer 400 may include more than one pretreatment unit.

The printing unit 430 includes at least one marking unit transport belt 432 that receives the media sheets from the pretreatment unit 420 or the media supply 410 and transports the media sheets through the printing unit 430. The printing unit 430 further includes at least one printhead (labeled CMYK in FIG. 10 to represent the standard cyan, magenta, yellow, and black color printheads; however any color printheads could be used). The printhead (CMYK) ejects aqueous ink onto the media sheets as the media sheets are transported through the printing unit 430. In the illustrated embodiment, the printing unit 430 includes four printheads (CMYK), each of which ejects one of cyan, magenta, yellow, and black ink onto the media sheets. The reader should appreciate, however, that other embodiments include other printhead arrangements, which may include more or fewer printheads, arrays of printheads, etc.

The dryer 440 includes a heater 442 and a vacuum drying belt 444 that receives the media sheets from the printing unit 430. A vacuum plenum 446 connects to a vacuum blower or the plumbing that is connected to a vacuum blower at one side in the cross-process direction. The output tray 120 receives the printed sheets 452.

While FIGS. 9 and 10 illustrate four marking stations adjacent or in contact with a rotating belt, which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

As would be understood by those ordinarily skilled in the art, the printing devices shown here are only examples and the systems and methods herein are equally applicable to other types of printing devices that may include fewer components or more components. For example, while a limited number of printing engines and paper paths are illustrated, those ordinarily skilled in the art would understand that many more paper paths and additional printing engines could be included within any printing device used with systems and methods herein.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
    a portable case having a bottom surface opposite a top, and having opposed sides;
    a slide-out printer connected to the portable case, wherein the slide-out printer is non-detachable from the apparatus, wherein the slide-out printer is connected to slide in and out of the portable case, wherein the slide-out printer includes a scanner, and wherein the scanner includes a platen positioned approximately parallel to the top of the portable case; and
    a slide-out shredder connected to the portable case, wherein the slide-out shredder is connected to slide in and out of the portable case,
    wherein the slide-out printer and the slide-out shredder are positioned to extend from opposing sides of the portable case in opposite directions to one another.

2. The apparatus according to claim 1, wherein the slide-out printer includes a slide-out output tray, wherein the slide-out output tray is connected to slide in and out of the slide-out printer, wherein the slide-out output tray has a top surface positioned to receive printed sheets from an output slot of the slide-out printer, and wherein the bottom surface of the portable case and the top surface of the slide-out output tray face approximately opposite directions.

3. The apparatus according to claim 1, further comprising a platen cover connected to the scanner, wherein the platen cover is connected and positioned to cover the platen when in a closed position and to reveal the platen when in an open position, and wherein the scanner and platen cover are sized and positioned to fit within the portable case and allow the slide-out printer to be slid into the portable case when the platen cover is in the closed position.

4. The apparatus according to claim 1, wherein the slide-out printer includes an output slot adapted to output printed sheets, wherein the portable case includes a case opening, and wherein the case opening is sized and positioned to allow the printed sheets being output from the output slot when the slide-out printer is in a fully inserted position to pass through the case opening and exit the portable case.

5. The apparatus according to claim 1, further comprising electrical and communication connection terminals connected to the portable case, wherein the electrical and communication connection terminals are connected internally within the portable case to the scanner and to the slide-out printer.

6. The apparatus according to claim 1, further comprising a battery connected to an external surface of the portable case, wherein the battery powers the slide-out printer and the slide-out shredder.

7. An apparatus comprising:
    a portable case having a handle, a bottom surface opposite a top, and having opposed sides;
    fold-out legs connected to the bottom surface of the portable case;
    a slide-out printer connected to the portable case, wherein the slide-out printer is non-detachable from the apparatus, wherein the slide-out printer is connected to slide in and out of the portable case, wherein the slide-out printer includes a scanner, and wherein the scanner includes a platen positioned approximately parallel to the top of the portable case; and
    a slide-out shredder connected to the portable case, wherein the slide-out shredder is connected to slide in and out of the portable case,
    wherein the slide-out printer and the slide-out shredder are positioned to extend from opposing sides of the portable case in opposite directions to one another.

8. The apparatus according to claim 7, wherein the slide-out printer includes a slide-out output tray, wherein the slide-out output tray is connected to slide in and out of the slide-out printer, wherein the slide-out output tray has a top surface positioned to receive printed sheets from an output slot of the slide-out printer, and wherein the bottom surface of the portable case and the top surface of the slide-out output tray face approximately opposite directions.

9. The apparatus according to claim 7, further comprising a platen cover connected to the scanner, wherein the platen cover is connected and positioned to cover the platen when in a closed position and to reveal the platen when in an open position, and wherein the scanner and platen cover are sized and positioned to fit within the portable case and allow the slide-out printer to be slid into the portable case when the platen cover is in the closed position.

10. The apparatus according to claim 7, wherein the slide-out printer includes an output slot adapted to output printed sheets, wherein the portable case includes a case opening, and wherein the case opening is sized and positioned to allow the printed sheets being output from the output slot when the slide-out printer is in a fully inserted position to pass through the case opening and exit the portable case.

11. The apparatus according to claim 7, further comprising electrical and communication connection terminals connected to the portable case, wherein the electrical and communication connection terminals are connected internally within the portable case to the scanner and to the slide-out printer.

12. The apparatus according to claim 7, further comprising a battery connected to an external surface of the portable case, wherein the battery powers the slide-out printer and the slide-out shredder.

13. An apparatus comprising:
    a portable case having a slide-out handle and wheels, a bottom surface opposite a top, and having opposed sides, wherein the slide-out handle and the wheels are connected to opposing ends of the portable case;
    fold-out legs connected to the bottom surface of the portable case;
    a lid connected to the portable case, wherein the lid is connected to be openable;
    a worksurface along the portable case, wherein the worksurface faces an approximately opposite direction to the bottom surface of the portable case, wherein the lid is sized and positioned to enclose the worksurface when in a closed orientation and to reveal the worksurface when in an open orientation;
    a slide-out printer connected to the portable case, wherein the slide-out printer is non-detachable from the apparatus, wherein the slide-out printer is connected to slide in and out of the portable case, wherein the slide-out printer includes a scanner, wherein the scanner includes a platen, and wherein the platen is approximately parallel to the worksurface; and a slide-out shredder connected to the portable case, wherein the slide-out shredder is connected to slide in and out of the portable case, wherein the slide-out shredder has a sheet input that faces the approximately opposite direction to the bottom surface of the portable case, wherein the slide-out printer and the slide-out shredder are positioned to extend from opposing sides of the portable case in opposite directions to one another.

14. The apparatus according to claim 13, wherein the slide-out printer includes a slide-out output tray, wherein the slide-out output tray is connected to slide in and out of the slide-out printer, wherein the slide-out output tray has a top surface positioned to receive printed sheets from an output slot of the slide-out printer, and wherein the bottom surface of the portable case and the top surface of the slide-out output tray face approximately opposite directions.

15. The apparatus according to claim 13, further comprising a platen cover connected to the scanner, wherein the platen cover is connected and positioned to cover the platen when in a closed position and to reveal the platen when in an open position, and wherein the scanner and platen cover are sized and positioned to fit within the portable case and allow the slide-out printer to be slid into the portable case when the platen cover is in the closed position.

16. The apparatus according to claim 13, wherein the slide-out printer includes an output slot adapted to output printed sheets, wherein the portable case includes a case opening, and wherein the case opening is sized and positioned to allow the printed sheets being output from the output slot when the slide-out printer is in a fully inserted position to pass through the case opening and exit the portable case.

17. The apparatus according to claim 13, further comprising electrical and communication connection terminals connected to the portable case, wherein the electrical and communication connection terminals are connected internally within the portable case to the scanner and to the slide-out printer.

* * * * *